United States Patent [19]

Saegusa et al.

[11] 3,941,681
[45] Mar. 2, 1976

[54] PROCESS FOR CONVERTING INFERIOR HEAVY OIL INTO LIGHT OIL AND GASIFYING THE SAME

[75] Inventors: Hitoshi Saegusa, Osaka; Masami Yoshitake, Sakai, both of Japan

[73] Assignee: Mitsui Shipbuilding and Engineering Co., Ltd., Tokyo, Japan

[22] Filed: Dec. 11, 1974

[21] Appl. No.: 531,600

[30] Foreign Application Priority Data
Dec. 17, 1973 Japan.............................. 48-141641

[52] U.S. Cl................. 208/107; 23/288 A; 48/92; 48/197 R; 208/53; 208/127
[51] Int. Cl.².................... C10G 37/06; B01J 8/22
[58] Field of Search ............. 208/112, 108, 107, 53

[56] References Cited
UNITED STATES PATENTS

| | | | |
|---|---|---|---|
| 2,730,488 | 1/1956 | De Rosset............................ | 208/125 |
| 3,202,603 | 8/1965 | Keith et al. ......................... | 208/107 |
| 3,553,279 | 1/1971 | Bawa................................... | 260/683 R |
| 3,745,109 | 7/1973 | Heredy et al. ...................... | 208/107 |
| 3,862,025 | 1/1975 | Steele et al. ....................... | 208/109 |

*Primary Examiner*—Herbert Levine
*Assistant Examiner*—G. E. Schmitkons
*Attorney, Agent, or Firm*—Howson and Howson

[57] ABSTRACT

A process for converting inferior heavy oil into light oil and gasifying the same characterized in that a hydrocracking zone comprising coke fluidized bed and a gasification zone comprising a molten alkali salt are provided, the raw oil is fed in said hydrocracking zone to be hydrocracked and produce coke to form a fluidized bed, and a part of the raw oil is fed in said gasification zone for obtaining the fluidizing gas.

2 Claims, 1 Drawing Figure

U.S. Patent  March 2, 1976  3,941,681
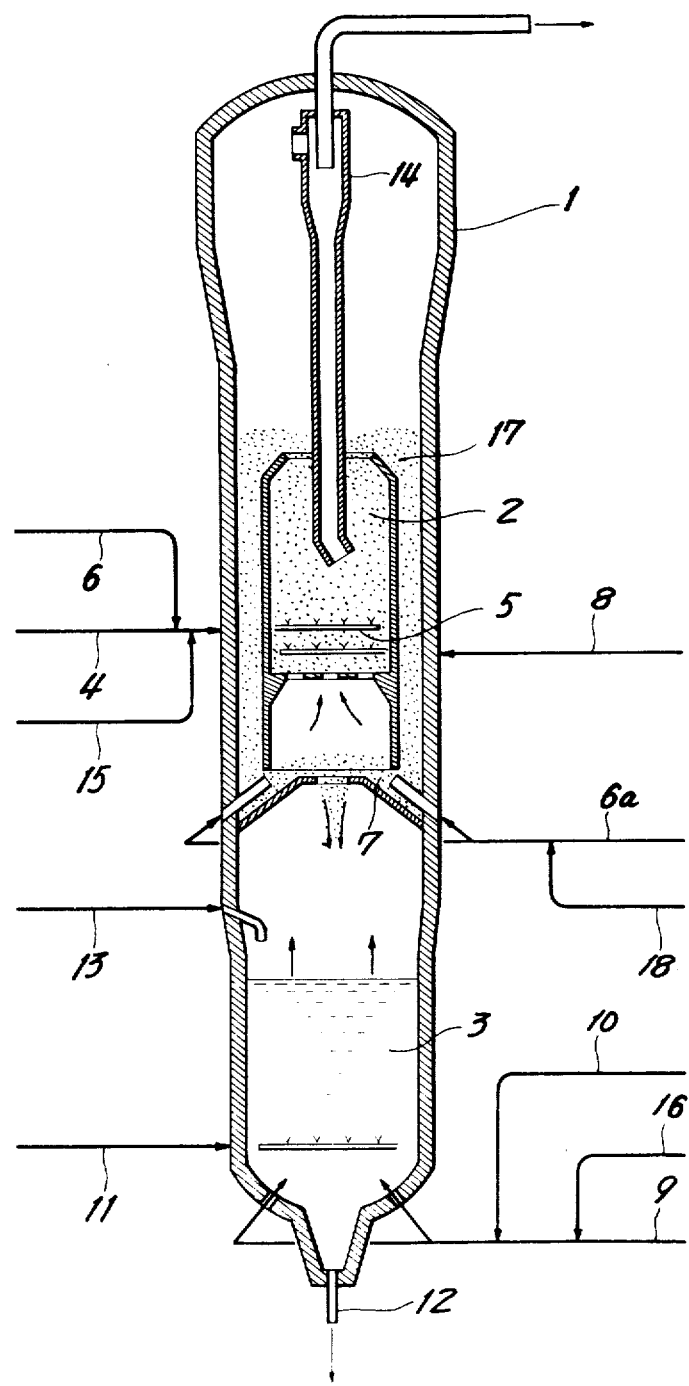

PROCESS FOR CONVERTING INFERIOR HEAVY OIL INTO LIGHT OIL AND GASIFYING THE SAME

The present invention relates to a process for preparing light oil and fuel oil from inferior heavy oil. More particularly, the present invention relates to a process for preparing light oil rich in saturated components and fuel oil of a high calorific value from an inferior heavy oil such as an atmospheric or reduced pressure residual oil, thermally cracked oil, tar or pitch.

As conventional processes, there may be mentioned three processes disclosed in specifications of U.S. Pat. No. 3,202,603 and Official Gazettes of Japanese Pat. Lay-Opens Nos. 15406/1972 and 45503/1973.

A reactor used in the process of said U.S. Pat. No. 3,202,603 is a one tower system comprising three parts, i.e. a fluidized bed cracking zone, a fixed bed middle zone and a fluidized bed burning zone. A formed coke is introduced into the burning zone through the fixed bed middle zone. In the cracking zone, hydrogen gas is fed so as to keep a partial pressure of hydrogen of higher than 35 psi. A raw oil is hydro-cracked in the cracking zone. It is supposed that, according to this process, it is possible to introduce the formed carbon from the cracking zone into the burning zone, since the preferred temperature range in the cracking zone is as high as 704'-816°C. However, if the temperature in the cracking zone is lowered to 450°-650°C which is a preferred condition in the hydro-cracking zone, it is quite difficult to transfer the formed carbon into the cracking zone, since caking coke is formed. Even if the transfer is possible, carbon will adhere to a filler in the middle zone and the middle zone cannot be prevented from blocking with carbon. Thus, continuous operation is impossible. Further, due to the high temperature employed in the cracking zone, the cracked oil formed is small in quantity. As to the composition of the product, it comprises benzene hydrocarbons and naphthalene hydrocarbons. Thus, the process of said U.S. Pat. No. 3,202,603 has a disadvantage that a high temperature is indispensable in the cracking zone due to the structure of the reactor and the reaction operation of the process.

According to the present invention, the raw materials can be treated at a low temperature without the above disadvantages.

In the process of said Japanese Pat. Lay-Open No. 15406/1972, a two-column system is employed. The formed coke is fluidized and circulated in both the coker zone and gasification zone. Due to the facts that the system comprises a fluidized bed of two columns and that a circulation system of coke is employed, control of the materials, heat and flow is complicated and a precise operation is required. Another disadvantage is that a large amount of the formed coke must be circulated for keeping the thermal balance. According to the present invention, thermal circulation of particles is eliminated and heat supply is made possible. Further, according to the process of said Japanese Pat. Lay-Open No. 15406/1972, operation under pressure is impossible, hydrocracking in the coker zone is impossible and the light oil thus formed is rich in unsaturated components. The inventors of the present invention have succeeded in the preparation of light oil rich in saturated components by hydrocracking raw oil in a high-hydrogen atmosphere under pressure.

A reactor used in said Japanese Pat. Lay-Open No. 45503/1973 comprises two columns of gasification zone and coker zone in which a molten medium containing an alkaline reactant and a glass-forming oxide is circulated. It is described therein that by the incorporation of the glass-forming oxide in the alkaline reactant, coke formed in the reactor is prevented from forming of a separate phase instead of being suspended in the molten medium and that it is made possible to suspend the coke uniformly in the melt. However, it has been proved from the results of the inventors' investigations that in such continuous operation, the coke granules formed accumulate and float on the molten medium. As a result, the formed floating coke cannot be circulated, while the molten medium along is circulated. This tendency is increased as the ratio of quantity of oil fed to the quantity of the molten medium is increased. According to the present invention, the molten alkali medium is used in only the gasification zone and the molten medium is not circulated and, therefore, the formed coke is not suspended in the molten medium. Accordingly, the addition of the glass-forming oxide which is inconvenient for the control of composition of the molten medium is unnecessary.

In the above three conventional processes, it is desirable to simplify the apparatus and thus also simplify the circulation and control of the solid particles, coke and molten medium.

According to the present invention, this problem has been solved by eliminating the thermal circulation system. As to the properties of the formed light oil, the product of said U.S. Pat. No. 3,202,603 contains a large quantity of aromatic components due to the high temperature in the cracking zone; the products of both Japanese Pat. Lay-Open No. 15406/1972 and Japanese Pat. Lay-Open No. 45503/1973 contain unsaturated components due to the thermal cracking reaction. According to the present invention, light oil rich in saturated components can be obtained, since the raw oil is hydrocracked in a high-hydrogen atmosphere under pressure.

The object of the present invention is to provide a method with which it is possible to prepare light oil rich in saturated components in a maximum yield from an inferior heavy oil with a unified apparatus comprising a hydrocracking zone and a gasification zone.

The characteristic features of the present invention are as follows: (a) The gasification zone comprises a molten alkali salt bath and the reaction is carried out under pressure. (b) The hydrocracking zone comprises a fluidized bed of the formed coke. (c) The heat source in the hydrocracking zone is the sensible heat of a gas generated in the gasification zone but heat supply by circulation system is not effected. (d) The reaction in the hydrocracking zone is carried out at a high hydrogen concentration under pressure to hydrocrack mainly the inferior heavy oil.

The alkali salt of the present invention may be any salt having a melting point lower than 900°C and lower than the gasification temperature. An effective molten medium is a mixture of two or three compounds selected from the group consisting of potassium carbonate, lithium carbonate and sodium carbonate. Accumulation of a simple substance such as vanadium, nickel, iron, silicon, aluminum, magnesium, calcium or sulfur or a compound comprising those elements does not disturb the catalytic reaction at all. In case the accumulation is remarkable, a part of the reaction mixture is removed from the reaction system and treated with water to remove the accumulation to thereby regenerate the same. The utilization of a molten medium such as an alkali salt, an alkali hydroxide, a glass-forming oxide or a metal in the gasification zone has already been known in the gasification technique of coal and heavy hydrocarbons. Particularly, alkali salts act powerfully as water-gasification and dehydrogenation catalyst to promote the gasification reaction, although the activity thereof is less than that of the alkali hydroxides. Thus, an advantage of the present invention is that the reaction proceeds at a relatively low temperature in the gasification section. The alkali salts thus act as water-gasification and dehydrogenation catalysts as described above and, accordingly, the formed gas which is rich in hydrogen acts effectively in the hydrocracking reaction in the hydrocracking zone.

The gasification zone is supplied with the raw inferior heavy oil as a part of the heat source for heating the entire reactor. Coke by-produced by the cracking of the raw oil and coke from the hydrocracking zone are gasified completely with oxygen and steam in the gasification zone. On the other hand, the raw oil may be introduced in the hydrocracking zone in the non-cracked form, being not completely gasified. The reason therefore is that non-cracked raw oil formed in the gasification zone and the formed light oil are collected by entrainment in the coke fluidized bed in the hydrocracking zone and the heavy components are hydrocracked or coked, whereby the yield of the cracked oil is improved. This is an important advantage of the present invention which is obtained by unifying the hydrocracking zone and the gasification zone.

The fact that the reaction can be carried out rapidly at a relatively low temperature in the gasification zone is very advantageous to the selection of structural materials of the gasification zone. In conventional gasification processes, a temperature of above 1,000°C. has been necessitated in the gasification zone. However, according to the inventors' corrosion tests wherein various metallic materials were treated with molten alkali salts, a material resistant to a temperature above 1,000°C. could not be found. According to the present invention, the operation at a preferred temperature of 750° - 900°C has been made possible by (a) the catalytic action of the molten alkali salt, (b) effect of unifying the reactor and (c) finding that high nickel steel is a metallic material resistant to the molten alkali salt.

Generally, cracked oils contain unsaturated components in a large quantity and, therefore, hydrodesulfurization thereof after removing heavy oil components therefrom with a fractionator requires a large amount of hydrogen. If a large amount of hydrogen is consumed, the temperature in the reactor is raised. As a result, it is difficult to control the reaction, since the hydrodesulfurization is an exothermic reaction. By circulating a hydrogen-rich gas in the hydrocracking zone under pressure as in the present invention, the raw oil is hydrocraked to form an oil containing a smaller quantity of unsaturated components which oil is easily hydrodesulfurized in the subsequent step. Further, as compared with simple thermal cracking, the hydrocracking has a less endothermic value and, consequently, the calorific volume required for the heating is smaller. The heat source in the hydrocracking is the sensible heat of the gas generated in the gasification zone. In case the thermal cracking reaction is mainly caused in the hydrocracking, quantities of oxygen, steam and fuel oil to be fed into the gasification zone are large due to a high endothermic volume of the thermal cracking reaction and, consequently, the gas formed has a high carbon dioxide content. However, in the present invention, sensible heat of the heating gas may be small, since the hydrocracking is carried out in the hydrocracking zone and, consequently, quantities of oxygen, steam and fuel oil in the gasification zone are relatively small. A rate of oxygen consumption in cost of the product is quite high. In this regard, the present invention is very advantageous. Further, methanization reaction is caused, since the gasification is effected under a pressure of 5 - 8 atms. and, therefore, oxygen consumed is small in quantity from the viewpoint of equilibrium. Calorific volume is thus increased a little.

Another important effect of the present invention is that flow in the entire reactor and control of the heat balance are easy. Main causes thereof are that the thermal circulation system for heat transfer between the hydrocracking zone and the gasification zone is not provided and that the gasification zone comprises the melt. Thus, by controlling the fluidity condition in the hydrocracking zone, the flow in the entire reactor can be controlled. In addition, thermal control as in thermal circulation system in conventional processes is eliminated and thermal control is simplified according to the present invention.

The present invention will be described with reference to the accompanying drawing, in which The single FIGURE is a schematic drawing of an embodiment of reactor suitable for carrying out the present invention.

Referring to the drawing, a reactor 1 comprises a hydrocracking zone 2 and a gasification zone 3. The reactor 1 is operated under a pressure of 5 - 80 atms., preferably 20 - 50 atms. If the pressure in the hydrocracking zone 2 is lower than stated, the rate of thermal cracking is increased to increase the unsaturated component content of the produced oil. Therefore, a hydrogen partial pressure of at least 3 atms. is required. The operating temperature in the hydrocracking zone 2 is 450° - 650°C, preferably 500° - 600°C. Temperature in the gasification zone 3 is 700° - 1,000°C, preferably 750° - 900°C. If the molten medium used in the gasification zone 3 is a molten alkali salt of the present invention or another molten medium which does not participate in the present invention and if a material of the apparatus is corrosion-resistant, the process of the present invention can be carried out at a high temperature of above 1,000°C.

Raw oil 4 is preheated to 200° - 420°C and fed into the hydrocracking zone 2 through an inner tube of a double tube nozzle 5. 80 - 95 Vol. % of circulating hydrogen is fed through an outer tube of the raw oil nozzle. Clogging of the nozzle by carbon is prevented, since the circulating hydrogen prevents the inner tube of nozzle from overheating. 5 - 20 Vol. % of the circulating hydrogen is mixed with steam 18 and fed into a coke discharge zone 7 through 6a so that the discharge may be smoothly carried out. Further, flowing coke prevents the adhesion entrainment of the molten alkali salt on the wall of the zone 7. Steam 8 is supplied for fluidizing the coke bed and also for heat control.

The raw oil 4 is hydrocracked into light oil and fuel gas with hydrogen formed in the hydrocracking zone and circulating hydrogen. The light oil thus produced is rich in saturated components, since it is formed by hydrocracking. In the hydrocracking zone, a partial water-gasification reaction of the raw oil, produced heavy oil and coke occurs with steam from the gasification zone, in addition to the hydrocracking reaction. Simple thermal cracking reaction also occurs slightly. The raw oil 4, circulating hydrogen and controlling steam 8 absorb a calorific volume required for elevation from the preheated temperature to reaction temperature. The water-gasification reaction and thermal cracking reaction are both endothermic. The endothermic volumes of these reactions are balanced by the heat generated by hydrocracking and the sensible heat of the gas formed in the gasification zone to keep the temperature of the hydrocracking zone constant.

The major part of the coke formed in the hydrocracking zone overflows from downcomer 17 and is then introduced to the gasification zone 3 through the coke discharge zone 7, while a part of the coke is converted to water gas in the hydrocracking zone.

In the gasification zone, the raw oil 9, steam 10 and oxygen 11 preheated to 200° – 420°C, 200° – 500°C and 200° – 500°C, respectively, are introduced into the molten alkali salt. The raw oil is fed through the inner tube of the introduction nozzle of a double structure. The steam is fed through the outer tube thereof. Coking of the raw oil in the nozzle is thus prevented. The ratio of the raw oil 4 to the raw oil 9 is preferably 1 – 20. Amounts of steam 10 and oxygen 11 are preferably 0.1 – 5.0 and 0.1 – 1.0 part by weight, respectively, based on the raw oil 4. As the ratio of the raw oil 4 to the raw oil 9 is increased, quantity of steam to into the gasification zone is increased and, consequently, the partial pressures of carbon dioxide, carbon monoxide and unreacted steam in the formed gas are elevated to reduce the partial pressure of hydrogen. Too large a ratio of raw oil 4 to raw oil 9 is thus uneconomical, because the rate of hydrocracking is reduced. However, the process of the present invention can be carried out even if said ratio of 20 or more is employed for some reasons. In the present invention, as the ratio of oxygen fed to the total raw oil fed is increased, the ratio of the whole steam fed to the total raw oil fed is decreased. Further, as the former ratio is increased, yield of the oil formed is decreased and yield of gas formed is increased. In the gasification zone, coke suspended in the molten alkali salt and a part of the raw oil are oxidized by oxygen to generate heat. By the heat thus generated, the raw oil is thermally cracked to produce gas, oil and a large amount of coke. Coke remaining unburnt rapidly undergoes water-gasification reactions of following formulae (1) and (2) with steam by a catalytic effect of the molten alkali salt.

$$C + H_2O \rightleftarrows CO + H_2 \quad (1)$$

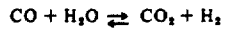

$$CO + H_2O \rightleftarrows CO_2 + H_2 \quad (2)$$

The gas formed in the gasification zone, light oil and non-cracked oil are introduced into a coke fluidized bed in the hydrocracking zone. The non-cracked oil is collected at the coke fluidized bed and hydrocracked together with the raw oil 4.

Recovered molten alkali salt is taken out from the tower bottom 12 in the gasification zone, introduced into a treatment step, then subjected to regeneration and sent in the form of a solid or liquid together with make up molten alkali salt through a feeding nozzle 13.

The gas from the hydrocracking zone is introduced in a purification process through a cyclone 14. The formed gas after heat recovery is divided into gas and liquid with an oil scrubber. The gas thus isolated is washed with an alkali after converting carbon monoxide into carbon dioxide and hydrogen with a carbon monoxide shift reactor. Thus, carbon dioxide and hydrogen sulfide are removed therefrom. The purified gas is rich in hydrogen (hydrogen content: 60 – 80 vol. %), 40 – 60% of which is introduced again as circulating hydrogen in the hydrocracking zone. The rest (40 – 60%) of the purified gas is mixed with LPG which will be described below to form a high calorific fuel gas.

Water is removed from the liquid isolated with the oil scrubber and the liquid is then subjected to fractional distillation to divide the same into gas, gasoline, light lamp oil, gas oil and bottom residue. The gaseous components are washed with an alkali and mixed as LPG with the gaseous product. The gasoline, light lamp oil and gas oil fractions are taken out as oil products. A part of the gas oil fraction is introduced to circulating oil 15 and mixed with the raw oil 4. A part of the residual gas oil is used as circulating oil for the oil scrubber. The bottom residue is introduced as circulating bottom oil in 16 and mixed with the raw oil 9. The oil product thus obtained still contains 0.5 – 2 wt. % of sulfur and, therefore, it is introduced in the desulfurization process, through the product is rich in saturated hydrocarbons, since it is a hydrocracked oil.

EXAMPLES 1 – 3

In a unified reactor of a length of 1.5 m and an inside diameter of 10 cm comprising hydrocracking zone and gasification zone, 3.0 kg of coke were charged in the hydrocracking zone and 4.7 kg of a salt mixture of sodium carbonate and potassium carbonate (molar ratio = 55 : 45) were charged in the gasification zone. A reduced pressure residue of Gattisaran having physical properties as shown in Table 1 was used as raw oil. The operation was effected under conditions of a pressure of 30 atms., temperature of the hydrocracking zone of 500°C and temperature of the gasification zone of 850°C. The formed oil and gas from the top of the column of hydrocracking zone were cooled with a tubular cooler. The gas was analyzed by the gas chromatography and the formed oil was subjected to a distillation test after water was removed from the oil. Operation conditions and results of the analysis are shown in Table 2.

EXAMPLES 4-5 4 –

The same procedure as in Examples 1 – 3 was repeated except that a mixture of alkali salts comprising sodium carbonate, potassium carbonate and lithium carbonate (molar ratio = 38 . 30 : 32) was used in the gasification zone and the that temperature of the hydrocracking zone was 550°C. Operation conditions and results of the analysis are shown in Table 3.

Table 1

| Properties of raw oil | |
|---|---|
| Name | : Gattisaran reduced pressure distillation residue |
| Specific gravity | : 1.02 |
| Penetration | : 86 (25°C) |
| Sulfur content | : 3.3 wt.% |

Table 1-continued

Properties of raw oil

| | | |
|---|---|---|
| Conradson carbon residue | : 19.1 wt.% | |
| H/C ratio (atomic ratio) | : 1.575 | |
| Metal contents | : V | 492 ppm |
| | Fe | 24 ppm |
| | Ni | 143 ppm |

Table 2

Operation conditions and results of analysis

| Operation conditions: | Ex. 1 | Ex. 2 | ex. 3 |
|---|---|---|---|
| Gasification zone | | | |
| Raw oil feed rate (Kg/hr.) | 0.16 | 0.30 | 0.82 |
| Steam feed rate (Kg/hr.) | 2.0 | 1.8 | 0.9 |
| Oxygen feed rate (Nm³/hr.) | 0.27 | 0.32 | 0.5 |
| Hydrocracking zone: | | | |
| Raw oil feed rate (Kg/hr.) | 1.0 | 1.0 | 1.0 |
| Steam feed rate (Kg/hr.) | 0.1 | 0.1 | 0.1 |
| Hydrogen gas feed rate (Nm³/hr.)* | 0.2 | 0.2 | 0.2 |
| Results of analysis | | | |
| Product gas (kg/hr.) | 1.44 | 1.66 | 2.69 |
| $H_2S$ (mol %) | 0.5 | 0.5 | 0.3 |
| $H_2$ | 41.6 | 40.8 | 39.5 |
| $CH_4$ | 6.9 | 8.5 | 11.3 |
| $C_2$ | 4.0 | 5.0 | 6.9 |
| $C_3 + C_4$ | 1.6 | 1.4 | 0.8 |
| CO | 16.0 | 15.6 | 14.9 |
| $CO_2$ | 29.4 | 28.7 | 26.4 |
| Cracked oil formed (kg/hr.) | 0.58 | 0.64 | 0.68 |
| 0 – 300°C (vol.%) | 18.5 | — | 19.0 |
| 300 – 320°C | 7.0 | — | 9.0 |
| 320 – 340°C | 10.5 | — | 11.0 |
| 340 – 360°C | 27.0 | — | 26.0 |
| 360 – 368°C | 17.0 | — | 18.0 |
| above 368°C | 20.0 | — | 17.0 |

*Gaseous mixture of 80 vol.% of hydrogen and 20 vol.% of steam.

Table 3

Operation conditions and results of analysis

| Operation conditions: | Example 4 | Example 5 |
|---|---|---|
| Gasification zone: | | |
| Raw oil feed rate (kg/hr.) | 0.18 | 0.29 |
| Steam feed rate (kg/hr.) | 2.57 | 2.34 |
| Oxygen feed rate (Nm³/hr) | 0.34 | 0.53 |
| Hydrocracking zone: | | |
| Raw oil feed rate (kg/hr.) | 1.0 | 1.0 |
| Steam feed rate (kg/hr.) | 0.1 | 0.1 |
| Hydrogen gas feed rate (Nm³/hr)* | 0.2 | 0.2 |
| Results of analysis: | | |
| Product gas (kg/hr.) | 1.5 | 1.7 |
| $H_2S$ (mol.%) | 0.5 | 0.4 |
| $H_2$ | 38.5 | 38.4 |
| $CH_4$ | 7.5 | 8.7 |
| $C_2$ | 4.4 | 5.2 |
| $C_3 + C_4$ | 1.7 | 1.5 |
| CO | 14.6 | 14.5 |
| $CO_2$ | 32.8 | 31.3 |
| Cracked oil formed (kg/hr.) | 0.56 | 0.6 |
| 0 – 260°C (vol.%) | 15.0 | 16.0 |
| 260 – 300 | 11.5 | 12.0 |
| 300 – 320 | 10.0 | 9.5 |
| 320 – 340 | 14.5 | 14.5 |
| 340 – 356 | 19.0 | 20.5 |
| above 356°C | 30.0 | 27.5 |

*Gaseous mixture of 80 vol.% of hydrogen and 20 vol.% of steam.

What is claimed is:

1. A process for converting inferior heavy oil into light oil and gasifying the same, comprising the steps of providing a hydrocracking zone comprising coke fluidized bed and a gasification zone comprising a molten alkali salt, feeding said inferior heavy oil into said hydrocracking zone, introducing produced gas into said hydrocracking zone to hydrocrack said raw inferior heavy oil in a high-hydrogen atmosphere, feeding the by-produced coke in said gasification zone together with a part of the circulating hydrogen and steam, feeding a part of said raw inferior heavy oil into said gasification none, to gasify the same with oxygen and steam in the molten salt, and feeding obtained high temperature gas into the hydrocracking zone for obtaining the fluidizing gas and sensible heat thereof.

2. A process for converting inferior heavy oil into light oil and gasifying the same in accordance with claim 1 in which said hydrocracking zone and gasification zone are provided in a single reaction vessel.

* * * * *